United States Patent Office 2,963,747
Patented Dec. 13, 1960

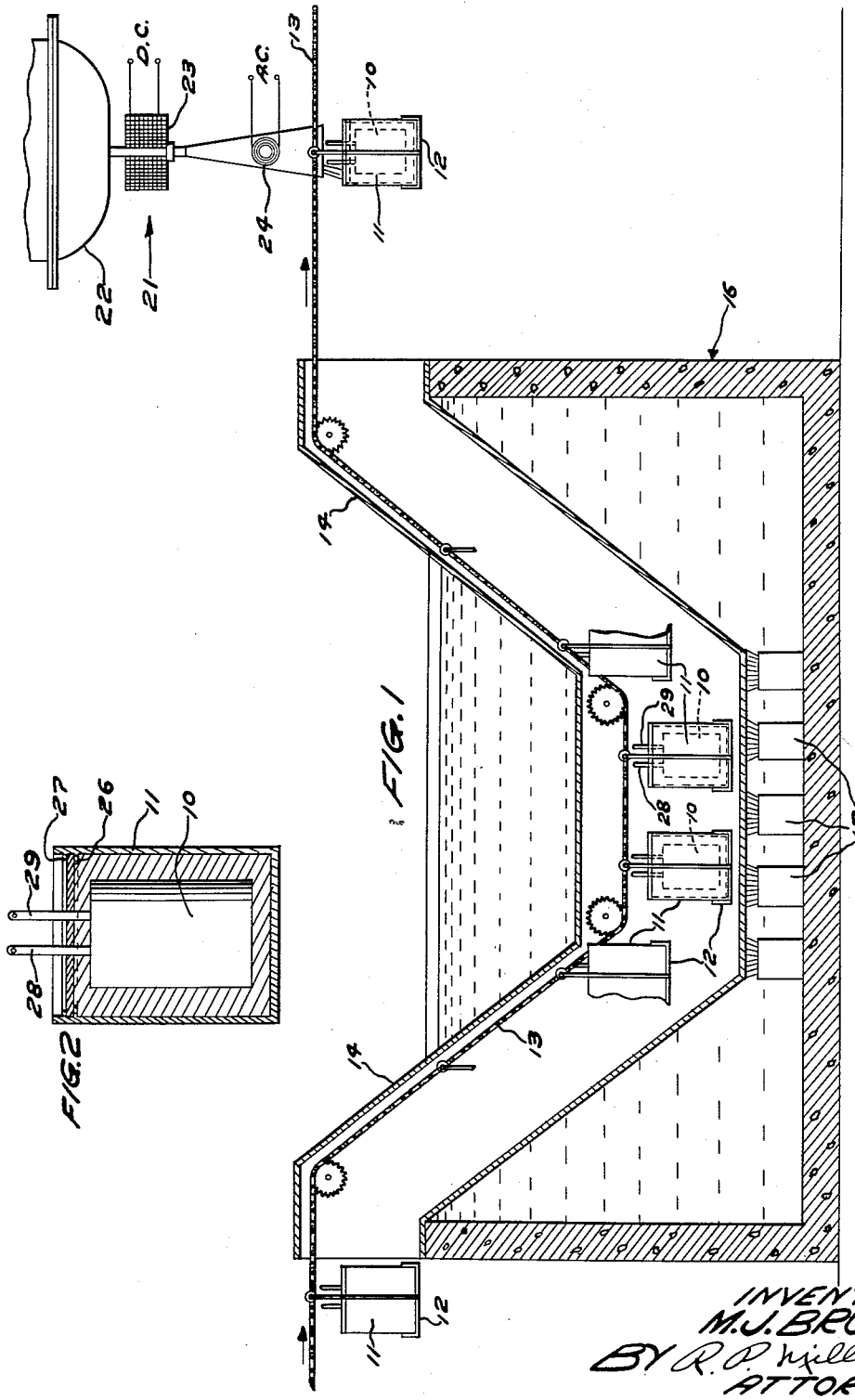

2,963,747

METHOD OF PLASTIC ENCAPSULATION USING IRRADIATION

Martin J. Brown, Chicago, Ill., assignor to Western Electric Company, Incorporated, New York, N.Y., a corporation of New York Filed May 15, 1957, Ser. No. 659,270

4 Claims. (Cl. 18—59)

This invention relates to a method of plastic encapsulation using irradiation, and more particularly to a method of encapsulation wherein a styrene-polyester casting resin is initially polymerized by gamma irradiation to produce a partially cured gelatinous mass that is further surface cured by beta irradiation to produce a hard encasing shell.

In prior encapsulating processes wherein it was desired to produce an encapsulated electrical component having a shock absorbing medium encasing the component surrounded by a wear resistant hard shell, it has been the practice to wrap or coat the component with a plastic material having shock absorbing properties and then apply a second encapsulating coating of another plastic material that is polymerized to provide a hard shell by addition of curing agents, promoters, catalysts or other initiators or inhibitors in combination with the application of heat. The resulting product has the property of resiliently supporting the encapsulated electrical component against external shock and internal stresses. However, these prior processes, using critical elevated temperatures and such catalytic agents as peroxides, require careful regulation and control to insure the attainment of the proper properties. Further, in the usual situation the catalyst is not all consumed in the process and as time passes the polymerizing action continues causing undesirable physical, mechanical and electrical properties to be imparted to the encapsulating materials.

A cardinal object of the invention is the provision of an improved method of encapsulating electrical components without attendant changes in electrical characteristics caused by the development of internal pressures.

It is another object of this invention to provide a method of producing an encapsulated electrical component having a gelatinous or viscous or resilient mass immediately surrounding the component and a hard wear resistant outer shell without the use of catalysts or heat.

A further object of the invention resides in an encapsulating process wherein a single encapsulating material is initially cured to a gelatinous state by relatively short exposure to gamma irradiation and then subjected to a beta irradiation to effectuate a substantially complete cure of the outer layer to form a hard wear resistant shell.

With these and other objects in view, the present invention contemplates a method of encapsulating electrical components by immersing said components in an unpolymerized styrene-polyester resinous liquid and then subjecting the resinous liquid to irradiation from a deep penetration gamma source until the liquid assumes a gelatinous or viscous state whereafter the gelatinous mass is irradiated from a shallow penetration beta ray source to completely cure the outer layer of encapsulating material into a hard wear resistant shell.

Other objects and advantages of the present invention will be apparent from the following detailed description when considered in conjunction with the accompanying drawing, wherein Fig. 1 is a view of apparatus for subjecting encapsulated electrical components to gamma and beta radiations in accordance with the principles of the invention; and Fig. 2 is a view of an electrical component that has been encapsulated by the apparatus shown in Fig. 1.

Referring to Fig. 1, an electrical component 10 such as a capacitor to be encapsulated is suspended in a container or mold 11 constructed of material that does not appreciably attenuate gamma rays. The mold can be constructed of aluminum, copper foil, thin walled glass or other light metals or similar materials having low radiation absorbing properties. In a preferred embodiment of the invention, the mold is constructed of thermoplastic or thermosetting organic material similar to that used for purposes of encapsulation. It has been found that a satisfactory mold can be constructed of a commercially available styrene-polyester resin known as "Selectron 5003." The aforementioned polyester resin comprises polymerizable polyesters or alkyds combined with approximately 34% of a reactive polymerizable monomer such as styrene or diallyl phthalate. The percentage of monomer present is varied slightly from time to time by the manufacturer to maintain a uniform viscosity of the product. The polyesters or alkyds contained in the resin are condensation products of polybasic acids (e.g., maleic acid, phthalic acid, etc.) and polyhydric alcohols (e.g., ethylene glycol, propylene glycol, etc.). Other electrical components such as resistors, coils, transistors, diodes or networks of these components can also be encapsulated by the practice of the method encompassed by the invention.

Molds 11 having electrical components 10 suspended therein are filled with a liquid unpolymerized encapsulating compound such as "Selectron 5003" and are then successively loaded on carriers 12 pivotally secured to a conveyor chain 13. Suitable drive means are provided to advance the carriers 12 into a thin wall steel tube 14 that runs through a well 16 having concrete walls. Submerged in water and positioned at the bottom of the well are a number of spent uranium fuel rods 17. The water acts as a shield to protect attendant personnel against the gamma rays emanating from the rods. Further, the water acts as a cooling medium for the fuel rods and any reactions induced by gamma radiation that happen to be exothermic.

As the molds 11 are carried by conveyor chain 13 past the fuel rods 17, the gamma radiation effectuates a polymerization of the encapsulating material. The time of exposure is controlled by the speed of the chain drive so that the reaction is only carried to such an extent as to set the material into a gelatinous state. Satisfactory polymerization can be obtained by use of radiation dose rates of from $0.75 \times 10^6$ to $2.5 \times 10^6$ roentgens per hour. A dose rate of $2.0 \times 10^6$ roentgens per hour is considered to be particularly satisfactory. It is to be understood that other sources of gamma radiation such as $Co^{60}$ or $Cs^{134}$ may also be used to irradiate the encapsulating material so long as the reaction is controlled to place the material in a jelly or gelatinous state. It is not necessary that the molds 11 be carried by a conveyor so long as the molds and source of irradiation are only brought into proximity with each other for a sufficient length of time to set the encapsulating material in the gelatinous state. Obviously, the irradiation time required to effectuate the necessary setting or polymerization will be dependent upon such factors as the degree of gelatinization required, strength of the irradiating source, the composition and thickness of the mold, and the composition and volume of encapsulating material. The gamma rays have deep penetration abilities and as a consequence the entire mass of encapsulating material will be uniformly cured to a gelatinous state without the development of internal stresses and strains as is so often the situation in prior chemical and thermal polymerizing processes.

Next, the conveyor carries the molds from the tube 14 into close proximity to a source of beta radiation which in the drawing is disclosed as a well known type of high voltage generator 21 susceptible of producing and accelerating a beam of high energy electrons but it could also be a source of direct radiation such as strontium–89 or 90 or some other type of artificial beta ray generator such as a Van der Graaff high energy electron accelerator.

The beta ray generator consists essentially of a source of beta rays 22, a D.C. focusing field winding 23 and an A.C. sweep control winding 24. As mold 11 is moved into register with the beta generator, the beta rays are caused to sweep the upper surface of the exposed gelatinous encapsulating material. Beta rays do not have the penetrating properties of gamma rays; consequently, only a shallow depth of the gelatinous material will be penetrated by the rays. These beta rays will, however, effectuate a continuation of the polymerizing action so that the upper portion of the gelatinous material will be transformed into a hard wear resistant mass. This hardened mass will be retained within the mold by a pair of lips 26 and 27 formed about the upper inner edges of each mold. The mold now becomes a casing or shell for the encapsulated component 10 that is now suspended within the relatively soft gelatinous mass. The electrical component has terminals 28 and 29 that are held by the now hardened upper layer of encapsulating material and serve as a means for holding the component suspended in the mass.

If desired, the mold need not form a part of the completed encapsulated article. In this instance, a thin wall mold is provided of a material that will not appreciably attenuate beta rays, and both the exposed surface of the encapsulating material and the entire outer surface of the mold are exposed to beta irradiation. There is a hardened layer of encapsulating material formed not only at the upper exposed surface but also beneath all sections of the mold. These hardened layers act as a shell encasing the component suspended within the remainder of the encapsulating material that is in a gelatinous state. The encapsulated assembly may be then removed from the mold. As an alternative, the partially polymerized gelatinous mass with the component therein may be removed as a unit from the mold prior to exposure thereof to the beta radiation. It is only necessary that the partial polymerization effected by the gamma irradiation have proceeded to a point where the gelatinous mass will retain a coherent form upon removal from the mold.

It is to be understood that the above-described methods, arrangement of apparatus and composition of matter are simply illustrative of an application of the principles of the invention and many other modifications may be made without departing from the invention.

What is claimed is:

1. The method of encapsulating an article, which comprises the steps of suspending the article in a body of a liquid organic resin of a type that crosslinks gradually to effect a cure thereof upon exposure to gamma and beta radiation, irradiating the entire body of the liquid resin with gamma rays until the entire body thereof has been partially cured into a gelatinous body surrounding the article, and then irradiating only an outer surface of the gelatinous body of the resin with beta rays until an outer layer thereof has been cured into a hard protective layer on the surface of the gelatinous body, the thickness of the resin body being sufficient to permit only partial penetration by the beta rays.

2. The method of encapsulating a capacitor in a styrene-polyester resin which comprises suspending said capacitor in a mold, pouring liquid unpolymerized styrene-polyester resin into the mold to submerge the capacitor, the thickness of said resin being sufficient at all points to preclude other than partial penetration by beta radiation, subjecting the mold and contents thereof to gamma irradiation to place the resin in a gelatinous state, and then subjecting the exposed surface of gelatinous resin to beta radiation to harden an outer layer of the gelatinous resin.

3. The method of encapsulating an electrical component which comprises immersing the component in a mold containing a styrene-polyester resin in liquid state, subjecting said mold and contents thereof to a gamma irradiation at a rate of from $.75 \times 10^6$ to $2.5 \times 10^6$ roentgens per hour to partially polymerize the resin into a gelatinous state, removing the gelatinous resin and embedded component as a unit from the mold, and then subjecting the resin to a beta radiation to completely polymerize only the outer layer of gelatinous resin.

4. The method according to claim 1, wherein the article is an electrical component and the resin is a styrene-polyester resin.

References Cited in the file of this patent
UNITED STATES PATENTS

| | | |
|---|---|---|
| 1,586,850 | Smith | June 1, 1926 |
| 2,763,609 | Lewis et al. | Sept. 18, 1956 |
| 2,793,970 | Jeppson | May 28, 1957 |
| 2,805,072 | Smith | Sept. 3, 1957 |

OTHER REFERENCES

Callinan: "Polymer Synthesis by Gamma Radiation," Journal Electrochem Soc., vol. 103, No. 5, pp. 292–296, May 1956.